United States Patent [19]

Samaritter et al.

[11] Patent Number: 5,145,882
[45] Date of Patent: Sep. 8, 1992

[54] PROCESS FOR THE PREPARATION OF LOW-DENSITY FLEXIBLE POLYURETHANE FOAMS

[75] Inventors: Reinhard Samaritter, Leverkusen; Peter Gansen; Klaus Seel, both of Cologne, all of Fed. Rep. of Germany

[73] Assignee: Bayer Aktiengesellschaft, Leverkusen, Fed. Rep. of Germany

[21] Appl. No.: 705,850

[22] Filed: May 28, 1991

Related U.S. Application Data

[63] Continuation-in-part of Ser. No. 463,715, Jan. 11, 1990, abandoned.

[30] Foreign Application Priority Data

Jan. 17, 1989 [DE] Fed. Rep. of Germany ....... 3901189

[51] Int. Cl.$^5$ ............................ C08G 18/06; C08J 9/00
[52] U.S. Cl. .................................... 521/155; 521/129; 521/164; 521/170
[58] Field of Search ............... 521/129, 155, 160, 164, 521/167, 170

[56] References Cited

U.S. PATENT DOCUMENTS

| | | | |
|---|---|---|---|
| 4,209,593 | 6/1980 | Khanna | 521/163 |
| 4,263,411 | 4/1981 | Bak | 521/108 |
| 4,508,774 | 4/1985 | Grabhoefer et al. | 521/51 |
| 4,645,630 | 2/1987 | Rasshofer et al. | 264/54 |
| 4,833,176 | 5/1989 | Wolf et al. | 521/160 |
| 4,927,864 | 5/1990 | Frisch, Jr. et al. | 521/128 |
| 4,945,117 | 7/1990 | Gansen et al. | 521/159 |

FOREIGN PATENT DOCUMENTS

1365015 8/1974 United Kingdom .

*Primary Examiner*—John M. Cooney, Jr.
*Attorney, Agent, or Firm*—Joseph C. Gil

[57] ABSTRACT

The present invention relates to a process for the preparation of low-density flexible polyurethane foams comprising reacting, in a closed mold, a mixture comprising polyisocyanates; compounds containing at least two isocyanate-reactive hydrogen atoms and having a molecular weight in the range from about 400 to about 10,000; water as blowing agent; optionally, compounds containing at least two isocyanate-reactive hydrogen atoms and having a molecular weight in the range from 32 to 399 as chain-extending and crosslinking agents; and optionally, one or more known auxiliaries and additives, wherein one or more of the reaction mixture components is heated before foaming to a temperature of at least 40° C.

12 Claims, No Drawings

PROCESS FOR THE PREPARATION OF LOW-DENSITY FLEXIBLE POLYURETHANE FOAMS

CROSS-REFERENCE TO RELATED APPLICATION

This application is a continuation-in-part of U.S. application Ser. No. 07/463,715 filed Jan. on 11, 1990 now abandoned.

BACKGROUND OF THE INVENTION

Flexible polyurethane foams are known to have a very wide variety of applications and are used in particular in the automotive industry and in the furniture industry. The quality of the flexible polyurethane foams normally used for cushioning seats and armrests is determined inter alia by their density. Regardless of the type of raw materials (that is, isocyanates or polyols) used for the production of molded foams, a certain density level has proved to be effective and practical for the various applications and associated demands involved.

It has previously been possible to produce moldings of varying density for the same foam formulation only by using physical blowing agents. In particular, the easily handled chlorofluorocarbons ("CFC's" and "HCFC's"), especially fluorotrichloromethane ("CFC 11"), have acquired a prominent position in this regard. The use of reduced pressures during the foaming process to reduce density has not previously been successful because of the elaborate techniques involved. Increasing the temperature of the raw materials while not otherwise changing the foaming parameters has not previously appeared to be a suitable way to obtain low density because gas volume calculations indicated the possibility of only a minimal reduction in density. That is, model calculations based on the ideal gas equation produce an estimated increase in density of approximately $$\frac{\Delta V}{V} = \frac{\Delta T}{T} = 0.04 = 4\%$$

for an increase in the temperature of the raw material of 15° C. This calculation is based on the assumption that the mean reaction temperature is 80° C. It has, however, now surprisingly been found that an increase in the temperature of the raw material of 15° C., for example, from 25° C. to 40° C., produces a reduction in density of more than 10%. This reduction cannot be explained by the temperature-induced increase in volume of the carbon dioxide formed.

The production of flexible foams is normally carried out at a raw material temperature in the range from 20° C. to 30° C. A temperature of 45° C. for example has not previously been used because the CFC 11 used would be likely to evaporate or because the reactivity of the reactants would be drastically increased compared with their reactivity at room temperature. The process according to the invention, however, now enables CFC's and HCFC's to be dispensed with altogether. Accordingly, by using the method of this invention, both problems attributable to increases in temperature can be avoided.

The increase in reactivity brought about by the increased temperature of the raw material naturally leads to different flow behavior because the reaction mixture creams at an earlier stage. However, at least equivalent flow behavior can be obtained by modifying the catalysis, for example, by using blocked amines and/or by reducing the quantity of catalyst. The reduction in the initial viscosity even leads to tendentially better flow.

Accordingly, the present invention relates to a process in which a distinctly lower density of the flexible foam moldings formed is obtained solely by an increase in the raw material temperature.

SUMMARY OF THE INVENTION

The present invention relates to a process for the preparation of low-density flexible polyurethane foams comprising reacting, in a closed mold, a mixture comprising
(a) polyisocyanates;
(b) compounds containing at least two isocyanate-reactive hydrogen atoms and having a molecular weight in the range from about 400 to about 10,000;
(c) water as blowing agent;
(d) optionally, compounds containing at least two isocyanate-reactive hydrogen atoms and having a molecular weight in the range from 32 to 399 as chain-extending and crosslinking agents; and
(e) optionally, one or more known auxiliaries and additives, wherein one or more of the components of the mixture are heated before foaming to a temperature of at least 40° C. and preferably to a temperature in the range from 40° to about 60° C. In general, either the polyisocyanate (a) or the isocyanate reactive components (i.e., components (b), (c) and (d)) or both are heated to the above noted temperature.

DETAILED DESCRIPTION OF THE INVENTION

In preferred embodiments of the invention, the polyisocyanate is heated to a temperature of at least 40° C. (preferably in the range from 40° to 60° C.) before being reacted with the other reaction components and/or the compounds containing at least two isocyanate-reactive hydrogen atoms and having a molecular weight in the range from 400 to 10,000 are heated to a temperature of at least 40° C. (preferably in the range from 40° to 60° C.) before being reacted with the other reaction components. In addition, in the preferred embodiments, the polyisocyanates used are based on diphenylmethane-4,4'-diisocyanate; additional organic blowing agents are used; and the compounds containing at least two isocyanate-reactive hydrogen atoms and having a molecular weight in the range from 400 to 10,000 are polyethers bearing at least two hdyroxyl groups which contain at least 10% by weight primary hydroxyl groups based on the total hydroxyl groups.

The following compounds are used as starting components for the preparation of flexible polyurethane foams according to the invention.

1. Known polyisocyanates, for example, of the diphenylmethane diisocyanate and/or tolylene diisocyanate type, including 2,4- and 2,6-tolylene diisocyanate and mixtures of these isomers ("TDI"); 4,4'-and/or 2,4'-diphenylmethane diisocyanate ("MDI"); hexamethylene diisocyanate; isophorone diisocyanate; polyphenyl polymethylene polyisocyanates of the type obtained by phosgenation of aniline-formaldehyde condensates ("crude MDI"); carbodiimide-, urethane-, allophanate-, isocyanurate-, urea-, or biuret-modified polyisocyanates derived from 2,4- and 2,6-tolylene diisocyanate, 4,4'- and/or 2,4'-diphenylmethane diisocyanate, hexamethylene diisocyanate, isophorone diisocyanate; and alkyl-substituted MDI types such as described, for example, in German Offenlegungsschriften 2,935,318, 3,032,128, and 3,032,358.

Suitable polyisocyanates are preferably those based on diphenylmethane-4,4'-diisocyanate (MDI), for example:

a) Diphenylmethane diisocyanates in admixture with polyphenyl polymethylene polyisocyanates, wherein the polyphenyl polymethylene polyisocyanate component makes up from 0 to 40% by weight and the diphenylmethane diisocyanate isomer component from 100 to 60% by weight.

b) Urethane-modified aromatic di- and/or polyisocyanates having an NCO content of from 15 to 30% by weight obtained by reaction of a mixture (as described in a)) of diphenylmethane diisocyanates and polyphenyl polymethylene polyisocyanates with a hydroxyl compound (optionally even several hydroxyl compounds) having a functionality of 2 to 6.

c) Mixtures of the MDI products described in a) and/or b) with at most 25% by weight aliphatic, cycloaliphatic, heterocyclic, or other different aromatic polyisocyanates of the type described, for example, by W. Siefken in *Justus Liebigs Annalen der Chemie*, 562, pages 75 to 136.

2. Compounds containing at least two isocyanate-reactive hydrogen atoms and having a molecular weight of generally from 400 to 10,000 ("polyol component"). In addition to compounds containing amino groups, thiol groups, or carboxyl groups, compounds such as these are, preferably, compounds containing hydroxyl groups (more especially compounds containing 2 to 8 hydroxyl groups), particularly those having a molecular weight in the range from 1,000 to 6,000 (preferably in the range from 2,000 to 6,000). Examples of such compounds include polyethers, polyesters, polycarbonates, and polyester amides generally containing from 2 to 8 (but preferably from 2 to 6) hydroxyl groups, of the type known for the production of homogeneous and cellular polyurethanes and described, for example, in German Offenlegungsschrift 2,832,253, pages 11 to 18. Such compounds preferably have an OH value in the range from about 28 to about 56. Polyethers bearing at least two hydroxyl groups and containing at least 10% by weight primary hydroxyl groups (based on the total number of hydroxyl groups) are particularly preferred.

3. Water as blowing agent, preferably in a quantity of from about 2 to about 6 parts by weight per 100 parts by weight of the "polyol component".

4. Optionally, compounds containing at least two isocyanate-reactive hydrogen atoms and having a molecular weight in the range from 32 to 399. Suitable compounds of this type can contain hydroxyl groups, amino groups, thiol groups, and/or carboxyl groups, and are preferably compounds containing hydroxyl groups and/or amino groups that are used as chain-extending agents or crosslinking agents. Such compounds generally contain 2 to 8 (preferably 2 to 4) isocyanate-reactive hydrogen atoms. Examples of such compounds are described in German Offenlegungsschrift 2,832,253, pages 10 to 20.

5. Optionally, auxiliaries and additives, including
a) readily volatile organic substances as further blowing agents;

b) known reaction accelerators (catalysts, preferably blocked amines, such as formic-acid-blocked bis(dimethylaminoethyl) ether), preferably in a quantity of from about 0.2 to about 0.5 part by weight per 100 parts by weight of the "polyol component";

c) surface-active additives, such as emulsifiers and foam stabilizers; known cell regulators, such as paraffins or fatty alcohols or dimethyl polysiloxanes; pigments or dyes; known flameproofing agents, such as tris(chloroethyl) phosphate and tricresyl phosphate; stabilizers against ageing and weathering; reaction retarders; plasticizers; fungistatic and bacteriostatic agents; and fillers, such as barium sulfate, kieselguhr, carbon black, or whiting.

These optional auxiliaries and additives are described, for example, in German Offenlegungsschrift 2,732,292, pages 21 to 24. Further examples of suitable surface-active additives and foam stabilizers, cell regulators, reaction retarders, stabilizers, flameproofing agents, plasticizers, dyes, fillers, and fungistatic and bacteriostatic agents, as well as particulars on the use and mode of action of these additives, can be found in Kunststoff-Handbuch, Vol. VII, edited by Vieweg and Höchtlen, Carl-Hanser-Verlag, Munich, 1966, for example, on pages 103 to 113.

The process according to the invention is carried out as follows by reacting the reaction components by the known single-stage process, the prepolymer process, or the semi-prepolymer process. The process can be carried out using machines, for example, of the type described in U.S. Pat. No. 2,764,565. Information on processing machines which may be used in accordance with the invention can also be found in Kunststoff-Handbuch, Vol. VII, edited by Vieweg and Höchtlen, Carl-Hanser-Verlag, Munich, 1966, for example, on pages 121 to 205.

The reaction of all the components takes place according to the invention at an isocyanate index above 70, preferably at an index in the range from 70 to 115.

The isocyanate index, a term commonly used in the production of polyurethane foams, reflects the degree of crosslinking of a foam. It is customary to regard a foam prepared using a quantity of isocyanate corresponding to the stoichiometric ratios or the theoretically necessary quantity of isocyanate as having been made with an isocyanate index of 100. Accordingly, by defining the index, it is possible to define more closely the degree of under crosslinking or over crosslinking. The isocyanate index is caluclated in accordance with the following general equation:

$$\text{Isocyanate index} = \frac{\text{Quantity of isocyanate (practical)} \times 100}{\text{Quantity of isocyanate (theoretical)}}$$

Foaming according to the invention is carried out in closed molds. To this end, the reaction mixture is introduced into a suitable mold. Suitable mold materials include metals, such as aluminum, or plastics, such as epoxy resin. The foamable reaction mixture foams in the mold to form the molding. It is possible to introduce a foamable reaction mixture into the mold in a quantity such that the foam formed just fills the mold. However, it is also possible to introduce more foamable reaction mixture into the mold than is necessary for filling the interior of the mold with foam, a technique known as overcharging and described, for example, in U.S. Pat. Nos. 3,178,490 and 3,182,104.

The flexible polyurethane foams obtainable in accordance with the invention are used, for example, as instrument panels, armrests (including automobile armrests) in beds and chairs, headrests, and seats in transport vehicles, particularly automobiles.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts are parts by weight.

EXAMPLES

Example 1

Preparation of a Flexible Polyurethane Foam

Component A

| | |
|---|---|
| 80 parts | a polyether polyol (OH value 28) prepared by propoxylation of trimethylolpropane and subsequent ethoxylation of the propoxylation product (ethylene oxide content 13%) ("Polyol A") |
| 20 parts | a polyether polyol (OH value 28) prepared by propoxylation of 1,2-propylene glycol and subsequent ethoxylation of the propoxylation product (ethylene oxide content 13%) ("Polyol B") |
| 3.6 parts | water |
| 0.2 part | bis(dimethylaminoethyl) ether |
| 0.35 part | 33% solution of diazabicyclo[2.2.2]octane in dipropylene glycol |
| 0.3 part | N,N-dimethylaminopropylformamide |
| 0.75 part | diethanolamine |
| 0.1 part | 2-ethylhexanoic acid |
| 1.0 part | a commercial stabilizer (KS 43, a product of Bayer AG) |
| 0.3 part | a commercial stabilizer (B 5246, a product of Goldschmidt AG) |
| 2.0 parts | a polyether polyol (OH value 36) prepared by propoxylation of glycerol and subsequent ethoxylation of the propoxylation product (ethylene oxide content 73%) |

Component B

An MDI semiprepolymer having an NCO content of about 25% prepared by reaction of MDI 85/25 (85% by weight binuclear content, 25% 2,4-MDI) with a polyether polyol (OH value 28) obtained by propoxylation of sorbitol and subsequent ethoxylation of the propoxylation product (ethylene oxide content 13%).

The reaction mixture is mixed in a high-pressure machine and introduced into a 20-liter box mold heated to 50° C. The mold is closed and after about 5 minutes the molding is removed from the mold. The minimum filling volume is experimentally determined, being that quantity at which a defect-free molding can still be produced.

The function of the acid in component A is to retard the initial reaction.

Mechanical testing of the various moldings produced the following property values:

| Isocyanate index | 95 | 95 | 85 | 85 |
|---|---|---|---|---|
| Component A temperature (°C.) | 30 | 46 | 30 | 46 |
| Component B temperature (°C.) | 20 | 36 | 20 | 36 |
| Density (kg/m³) | 49.5 | 41.9 | 49.7 | 41.8 |
| Compression hardness 40% (kPa) | 3.35 | 2.07 | 2.33 | 1.47 |
| Tensile strength (kPa) | 165 | 116 | 128 | 83 |
| Elongation at break (%) | 154 | 124 | 148 | 122 |
| Compression set, 50%, $C_t$ value (%) | 6.7 | 6.0 | 7.0 | 7.4 |

The reduction in density produced by the increase in temperature amounted to around 15% for both isocyanate indices.

Using the same component A and the same component B at a 95 isocyanate index, and using the same technique, four additional tests were run, and the densities of the resultant products measured. The conditions and results were as shown in the following table:

| | Component B Temperature, °C. | Component A Temperature, °C. | Density, kg/m³ |
|---|---|---|---|
| Test 1 | 25 | 25 | 49.8 |
| Test 2 | 25 | 45 | 44.9 |
| Test 3 | 45 | 25 | 47.4 |
| Test 4 | 45 | 45 | 41.1 |

Example 2

Preparation of a Flexible Polyurethane Foam

Component A

| | |
|---|---|
| 85 parts | Polyol A of Example 1 |
| 15 parts | Polyol B of Example 1 |
| 3.4 parts | water |
| 0.18 part | bis(dimethylaminoethyl) ether |
| 0.50 part | 33% solution of diazabicyclo[2.2.2]octane in dipropylene glycol |
| 0.60 part | N,N-dimethylaminopropylformamide |
| 0.96 part | diisopropanolamine |
| 0.20 part | a commercial stabilizer (B 4617, a product of Goldschmidt AG) |
| 1.00 parts | a polyether polyol (OH value 100) prepared by propoxylation of sorbitol and subsequent ethoxylation of the propoxylation product (ethylene oxide content 80%) |

Component B

Same MDI semiprepolymer as in Example 1 The components are processed in the same way as in Example 1.

Mechanical testing of various moldings produced the following property values:

| Isocyanate index | 90 | 90 |
|---|---|---|
| Component A temperature (°C.) | 18 | 54 |
| Component B temperature (°C.) | 16 | 24 |
| Density (kg/m³) | 52.9 | 47.2 |
| Compression hardness 40% (kPa) | 4.15 | 3.38 |
| Tensile strength (kPa) | 158 | 126 |
| Elongation at break (%) | 118 | 117 |
| Compression set, 50%, $C_t$ value (%) | 7.2 | 5.2 |

The reduction in density achieved in this Example amounted to 11%.

What is claimed is:

1. A process for the preparation of a low-density flexible polyurethane foam comprising reacting, in a closed mold, a mixture comprising (a) a polyisocyanate;

(b) a compound containing at least two isocyanate-reactive hydrogen atoms and having a molecular weight in the range from about 400 to about 10,000;
(c) water as blowing agent;
(d) optionally, a compound containing at least two isocyanate-reactive hydrogen atoms and having a molecular weight in the range from 32 to 399 as chain-extending and crosslinking agents; and
(e) optionally, one or more known auxiliaries and additives;

wherein one or more of the components of the mixture are heated before foaming to a temperature of at least 40° C.

2. A process according to claim 1 wherein the mixture is heated before foaming to a temperature in the range from 40° to 60° C.

3. A process according to claim 1 wherein the polyisocyanate is heated to a temperature of at least 40° C. before it is mixed with the other reaction components.

4. A process according to claim 3 wherein the polyisocyanate is heated to a temperature in the range from 40° to 60° C.

5. A process according to claim 1 wherein the compound containing at least two isocyanate-reactive hydrogen atoms and having a molecular weight in the range from 400 to 10,000 is heated to a temperature of at least 40° C. before it is mixed with the other reaction components.

6. A process according to claim 5 wherein the compound containing at least two isocyanate-reactive hydrogen atoms and having a molecular weight in the range from 400 to 10,000 is heated to a temperature in the range from 40° to 60° C.

7. A process according to claim 1 wherein the polyisocyanate is based on diphenylmethane-4,4'-diisocyanate.

8. A process according to claim 1 wherein the compound containing at least two isocyanate-reactive hydrogen atoms and having a molecular weight in the range from 400 to 10,000 is a polyether bearing at least two hydroxyl groups and containing at least 10% by weight primary hydroxyl groups based on the total number of hydroxyl groups.

9. A process according to claim 1 wherein one of the auxiliaries and additives is an organic blowing agent.

10. A process according to claim 1 wherein one of the auxiliaries and additives is a catalyst.

11. A process according to claim 10 wherein the catalyst is a blocked amine.

12. A process according to claim 1 for the preparation of a low-density flexible polyurethane foam comprising reacting, in a closed mold, a mixture comprising
(a) a polyisocyanate based on diphenylmethane-4,4'-diisocyanate;
(b) a polyether bearing at least two hydroxyl groups and containing at least 10% by weight primary hydroxyl groups based on the total number of hydroxyl groups and having a molecular weight in the range from about 400 to about 10,000;
(c) water as blowing agent;
(d) optionally, a compound containing at least two isocyanate-reactive hydrogen atoms and having a molecular weight in the range from 32 to 399 as chain-extending and crosslinking agents; and
(e) an organic blowing agent and a blocked amine catalyst;

wherein one or more of the components of said mixture is heated before foaming to a temperature in the range from 40° to 60° C.

* * * * *